Figure 1:
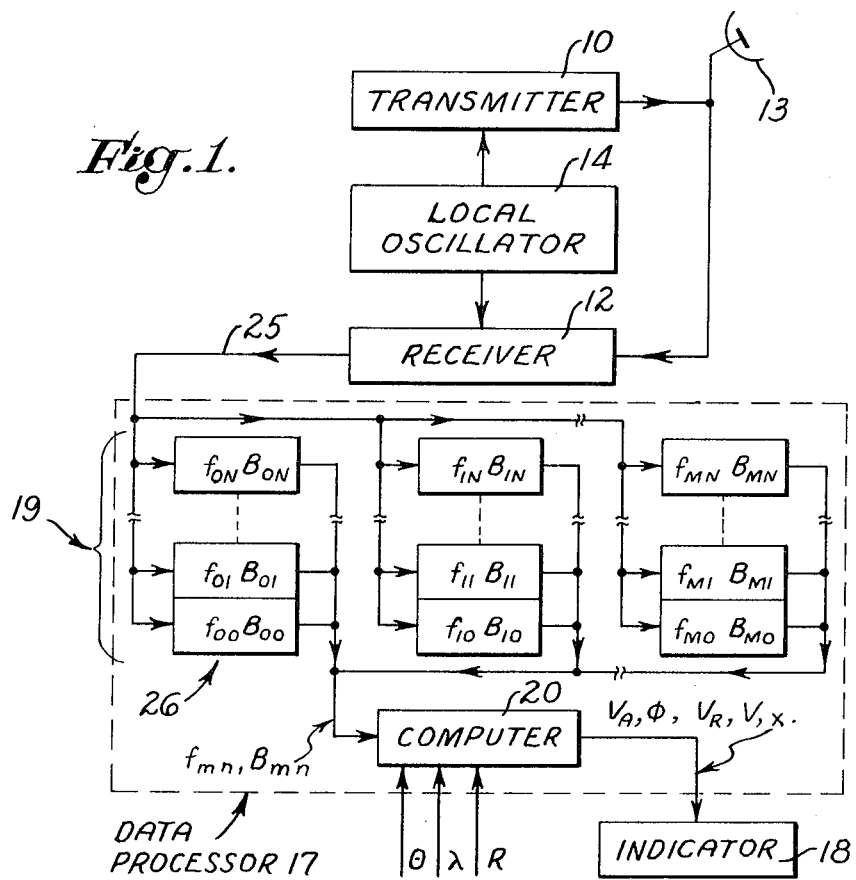

United States Patent [19]
Constant

[11] 3,798,644
[45] Mar. 19, 1974

[54] VECTOR VELOCITY SYSTEM

[76] Inventor: James Nickolas Constant, 1603 Danbury Dr., Claremont, Calif. 91711

[22] Filed: Aug. 7, 1972

[21] Appl. No.: 278,536

Related U.S. Application Data

[63] Continuation-in-part of Ser. No. 27,731, April 13, 1970, abandoned.

[52] U.S. Cl............................................. 343/8, 343/9
[51] Int. Cl.................................................. G01s 9/44
[58] Field of Search..................................... 343/8, 9

[56] References Cited
UNITED STATES PATENTS
2,617,093  11/1952  Flyer........................................ 343/9
2,848,713  8/1958  Cowart et al. ........................... 343/8

*Primary Examiner*—Maynard R. Wilbur
*Assistant Examiner*—G. E. Montone
*Attorney, Agent, or Firm*—Harris, Kern, Wallen & Tinsley

[57] ABSTRACT

Apparatus and method for measuring the angular velocity of an object in a single illumination utilizing a coherent system such as is utilized in a conventional doppler radar for radial velocity measurements. Apparatus and method for selecting specific frequency and bandwidth signals in the echo from the object illuminated by the coherent system, with the selected signal providing the data for subsequent computation to produce an output corresponding to the angular velocity of the object.

25 Claims, 2 Drawing Figures

VECTOR VELOCITY SYSTEM

This invention is a continuation-in-part of my copending application Ser. No. 27,731, now abandoned, filed Apr. 13, 1970 entitled ANGLE DOPPLER SYSTEM.

This invention relates to the determination of an object's vector velocity and more particularly to the determination of vector velocity in a single observation or illumination of the object using doppler frequency measurements. The vector velocity includes the angular velocity and the path angle.

In many instances it is desirable to identify or measure directly the vector velocity of a particular object. Typical examples are in the fields of aircraft, vessel and vehicular control, etc. In these fields, it often happens that the object has an angular or nonradial velocity relative to the observing site. Therefore, a suitable device, such as the vector velocity system, must be provided to determine the object's vector velocity. The vector velocity system permits the object's vector velocity to be determined in a single observation using conventional techniques.

An example of a system which is used to determine an object's radial velocity is based on the well known doppler principle for its operation and is commonly referred to as doppler radar. In this conventional doppler radar, the radial velocity of the object is measured in a single observation. The angular velocity of the object may be obtained in a conventional doppler radar by making two or more successive time observations of the object's radial velocity as it moves in its trajectory, noting the angle between the two directions of observation, and then using a trigonometric solution to compute the angular velocity. In this case, the determination of the object's angular velocity is accomplished indirectly through a series of individual observations during which the observing instrument is required to continually track the object over a portion of its trajectory and consequently at the expense of tracking time.

The present invention is directed to a system which overcomes many of the problems and limitations encountered in the determination of angular velocity present in the conventional doppler system. In accordance with the present invention, a system can be designed to measure angular velocity using conventional circuits or a doppler system can be modified to provide the added capability for angular velocity measurement as well. The vector velocity system in accordance with the present invention uniquely provides the angular velocity measurement in a single observation or illumination of the object without recourse to the need for continually tracking the object and the related expenditure of tracking time, thus freeing the system for other target assignments.

Utilizing the system of the present invention, data may be obtained from an object which will permit the determination of its vector velocity at any instant, i.e., in a single illumination of the object by the system.

It is therefore an objective of this invention to provide a system which measures the vector velocity of an object relative to the observing instrument at any instant.

A further objective of this invention is to provide a modification circuit for the conventional doppler system that will result in providing the added capability for angular velocity measurements of objects moving relative to the observing instrument at any instant. The term "at any instant" is used to denote a single illumination of the object by the radar or observing instrument. The term "doppler" is used to denote the determination of radial velocity from a measurement of doppler frequency shift by the signal. The term "angle doppler" is used to denote the determination of angular velocity from a measurement and subsequent integration of a series of doppler frequency shifts by the signal.

It is an object of the invention to provide apparatus and method for measuring the angular velocity of an object in a single illumination utilizing a coherent angle doppler system such as is utilized in a conventional doppler radar for radial velocity measurement. A further object is to provide such apparatus and method which may be utilized in the sonar and optical spectra as well as in the radar spectrum. An additional object is to provide apparatus and method for sorting out or selecting specific time varying signal frequencies in the echo from the object illuminated by the coherent system, with the selected time varying signal frequencies providing the data for subsequent processing using conventional techniques to produce an output indication which varies as a function of the angular velocity of the object.

Other objects, advantages, features and results will more fully appear in the course of the following description. The drawing merely shows and the description merely describes preferred embodiments of the present invention which are given by way of illustration or example.

Figure 2:
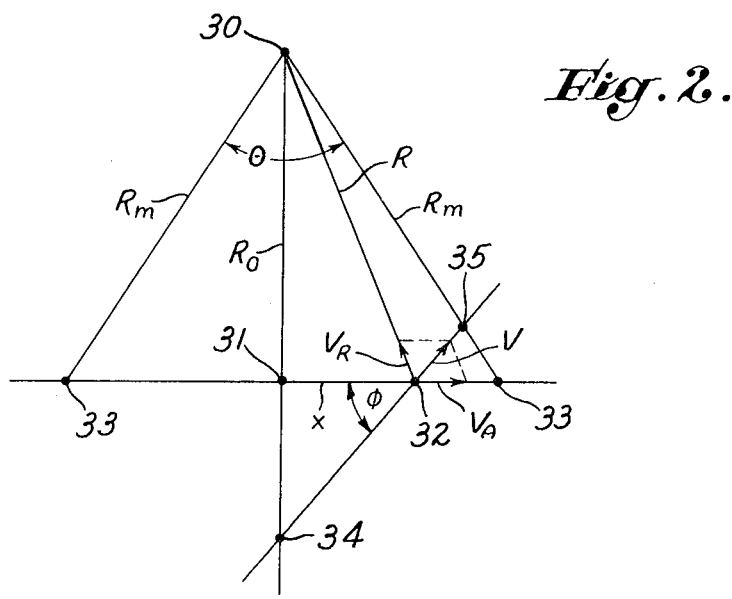

In the drawings:

FIG. 1 is a block diagram of a velocity vector system incorporating the presently preferred embodiment of the invention, and illustrating how a doppler system can be modified to provide the added capability for angular velocity measurement; and FIG. 2 is a diagram illustrating the geometry of the vector velocity system.

The system of FIG. 1 includes a transmitter 10 operating at wavelength $\alpha$, a receiver 12, an antenna 13 of beam width angle $\theta$, and a local oscillator 14 providing reference inputs for the transmitter and receiver, to provide a coherent system. The system also includes a data processor 17, and an indicator 18. The system may operate as a pulsed or continuous wave (CW) system. The system may operate with separate antennae for the transmitter and receiver or with a common antenna as desired, and a common antenna arrangement is illustrated in FIG. 1. The receiver output includes a time varying signal of frequency $f_{mn}$ and of bandwidth $B_{mn}$ produced by the echo from the object illuminated by and in transit of the antenna.

The data processor 17 includes a signal sorting unit 19 and a computer 20. The signal sorting unit includes a plurality of signal selection circuits connected in parallel and identified as $f_{mn} B_{mn}$ where $m = 0,1,2,—M$ and $n = 0,1,2,..., N$. The subscript $m$ represents M+1 possible discrete velocities V and the subscript $n$ represents N+1 possible discrete crossing angles $\phi$. The total number of selection circuits required is M×N, each circuit being determinative of a center frequency $f_{mn}$ and bandwidth $B_{mn}$ where the double subscript designates the $m$ for velocity and $n$ the crossing angle being measured by the circuit.

The individual signal selection circuits may be conventional in design and typically may be correlators, matched filters and/or pulse compression filters. Each signal selection circuit has a center frequency $f_{mn}$ and frequency bandwidth $B_{mn}$ where the center frequency increases as the value for the subscript n increases. The number of circuits M×N and their frequencies $f_{mn}$ and bandwidths $B_{mn}$ have been determined in accordance with well known design procedures to meet the particular application at hand. The frequency $f_{mo}$ is the radar intermediate frequency (IF) for a given angle of crossing while the frequency $f_{mN}$ is the highest doppler frequency which is expected to occur in the particular application. Not shown is the similar circuit for negative frequencies, which is redundant in the present discussion.

The receiver output 25 is directly connected to each of the selection circuits $f_{mn}B_{mn}$. Any one of the vertical banks of circuits such as the bank $f_{oo} B_{oo} - f_{oN} B_{oN}$ indicated at 26, corresponds to a conventional doppler system which provides the radial component of velocity of the object illuminated by the beam from the transmitter antenna. Bandwidth identification is not utilized in the conventional system. With the addition of bandwidth identification and additional banks of circuits such as $f_{10}B_{10} - f_{1N}B_{1N}$ through $f_{MO}B_{MO} - f_{MN}B_{MN}$, the system becomes the vector velocity system of the present invention with the output providing the vector velocity of the object illuminated by the beam from the transmitter antenna. It should be recognized that in a conventional doppler system, the selection circuits are usually implemented as simple frequency filters determinative only of frequencies $f_{mn}$, whereas in the system of the present invention, the selection circuits are usually implemented as a bank of correlators, matched filters or pulse compression filters determinative of both the doppler frequencies $f_{mn}$ and the signal bandwidths $B_{mn}$.

The computer 20 may be a conventional computer which will perform the calculations to be described below. One input to the computer is a signal from one of the selection circuits indicating the specific frequency $f_{mn}$ and bandwidth $B_{mn}$ in the receiver output. Other computer inputs include system parameters of transmitter wavelength $\lambda$ and antenna beam width angle $\theta$. The range R from antenna to the object may also be in input, the range being determined by conventional techniques. The distance x between the source line of sight and the object may also be computed, knowing the range and angular velocity.

The indicator 18 may be a conventional indicator such as an analog or digital meter or a cathode ray tube or the like. Of course an indicator is not essential and the computer output may be used directly for control or additional computation without display when desired.

In operation, the signal which appears at the receiver output 25 consists of the transmitter frequency $f_o$ and the doppler frequency $f$, the latter having frequency components corresponding to the radial and crossing velocity components of objects illuminated by the antenna. The transmitter frequency $f_o$ is located preferably in the intermediate band portion of electromagnetic frequencies and is preferably fixed. The term intermediate is most frequently used to denote a frequency which is located between the radio frequency (RF) and video frequency portions of a radar system. The exact frequency used in any one case is determined by the application at hand. Any of the well known types of intermediate frequency receivers capable of producing oscillations at the needed frequency $f_o$ may be utilized. The vector velocity system just described provides vector velocity measurements of an object relative to a source. The term source is used here in referring to the transmitter and antenna or other radiator. While specific reference is made to the radar spectrum, the system is also applicable to the sonar and optical spectra.

In order to describe the nature of the signal which results from the motion of an object relative to a source and the basis for the determination of its angular velocity using the vector velocity system of the present invention, reference is made to FIG. 2. To facilitate annotation, the following description will be presented for a specific object velocity $V_m$ and the subscript m will be omitted. For consideration of all velocities $m = 0,1,2,\ldots,M$, the subscripts $mn$ are substituted for the subscript n throughout equations (1) – (5). The instantaneous frequency $f$ which appears at the receiver output 25 is given to a close approximation by:

$$f = f_n + f_n' = 2/\lambda \ V \ [\sin \phi_n + \cos \phi_n \cdot x/R] \tag{1}$$

where $$f_n = 2/\lambda \ V_R = 2/\lambda \ V \sin \phi_n \tag{2}$$

$$f_n' = 2/\lambda \ V_A \cdot x/R = 2/\lambda \ V \cos \phi_n \cdot x/R \tag{3}$$

$$n = 0,1,2,\ldots,N$$

$\lambda$ = transmitted wavelength

V = velocity of the object in a direction inclined by the angle $\phi$ $\phi_n$ = angle between the direction of object motion and the normal to the radar line of sight $V_R, V_A$ = radial and angular components of the velocity V, respectively x = distance between the object and the line of sight R = range between the object and the source Equation (2) is the doppler equation in the form which determines the radial component $V_R$ of the velocity V of an object while equation (3) is the doppler equation in the form which determines the crossing or angular component $V_A$ of the velocity V. Equation (3) is called the angle doppler equation to distinguish it from equation (2), the doppler equation. The angle doppler equation is given in a variety of publications, for example, in "An Introduction to Synthetic Aperture Radar" Brown and Porcello, IEEE Spectrum, September, 1969, p. 52 (see equation 8). Unlike the doppler equation (2) wherein the radial component of the velocity $V_R$ is uniquely determined by the measurement of the doppler frequency $f_n$, the angular component of the velocity $V_A$ is not uniquely determined by measurement of the angle doppler frequency $f_n'$ but also requires the measurement or specification of the ratio $x/R$. If the instantaneous frequencies are integrated in the manner of synthetic aperture radar, i.e., if a number of frequencies are taken, the integral of the ratio $x/R$ is a known quantity, namely the angle $\theta$ of the beamwidth from the antenna at 30. Integration therefore of the instantaneous frequencies $f_n'$ permits the unique determination of the angular component $V_A$ of the velocity V.

Equations (1), (2), and (3) indicate that the signal which appears at the receiver output 25 consists of the sum of the steady and time varying frequency components $f_n$ and $f_n'$, respectively. Thus the signal at 25 is a chirp or FM signal at the center frequency given by equation (2) and having a bandwidth determined by integrating equation (3), between the limits for the angle $\theta$, $$B_n = 2/\lambda V_A \cdot \theta = 2/\lambda V \cos \phi_n \cdot \theta$$

(4)

In the system of the present invention, the chirp signal at 25 is processed in the data processor 17 of FIG. 1 in a manner which measures both $f_n$ and $B_n$, as example, by correlating the chirp signal with a stored replica of itself. The correlation produces values for the frequency $f_n$ and the bandwidth $B_n$ and therefore enables the computation of the radial and angular components of the velocity V using equations (2) and (4), respectively. In general, having measured the frequency $f_n$ and bandwidth $B_n$, the crossing angle $\phi_n$ may be computed by taking the ratio of equations (2) and (4) and is given to a close approximation as:

$$\tan \phi_n = f_n/B_n \cdot \theta$$

(5)

Having the crossing angle $\phi_n$, the radial and angular components of the velocity may be computed using equations (2) and (4). Since identification of a specific $f_n$ and $B_n$ for a selection circuit also identifies a specific $f_n'$, the offset distance x may be computed by equation (3).

In general, the object 32 moves in the direction between points 34 and 35 with a velocity V. The line through points 34 and 35 and the line through points 31 and 32 which is normal to the radar line of sight, defines the crossing angle $\phi$. Component velocities along the radial and angular directions relative to the source at 30 are given as $V_R$ and $V_A$, respectively. The distance between point 31 and object 32 is $x$. $R_o$ is the shortest slant range between the source at 30 and the straight line determined by points 31, 33 (with object 32 thereon). R is the range between the source at 30 and the object at 32. $R_m$ is the maximum slant range (30 to 33) which is being illuminated by the source. The source at 30 has a beamwidth $\theta$ which defines the total angle of energy which is being radiated by the source. The doppler frequencies which occur as a result of the radial velocity $V_R$ and the angular velocity $V_A$ are given mathematically in small angle approximations by equations (2) and (3), respectively. The source is specified to be a coherent system which includes a transmitter and antenna for illuminating objects, a receiver for measuring doppler frequencies, a data processor for determining the radial and angular velocity components of objects, and an indicator for displaying the information. In particular, the source is specified to have the capability for integrating and computing the instantaneous signals $f_n'$, given by equation (3), for the purpose of determining the angular velocity $V_A$.

Thus it is seen that the coherent vector velocity system of the invention includes a transmitter and receiver and an antenna for illuminating an object and provides for measuring the angular velocity of the object in a single observation or illumination. The system includes a data processor with selection circuits for sorting frequencies contained in a chirp signal of predetermined frequency and bandwidth, with the output of the data processor being the computed vector velocity of the object. The receiver output is connected as an input to the selection circuits and provides for each observation or illumination of the object an output signal of a specific frequency and bandwidth. Various of the conventional data processors may be utilized, including matched filters, correlators, and pulse compression filters, which may be implemented using well known hardware or computer software techniques. The data processor provides for computation of the crossing angle, velocity components, and vector velocity of the object observed or illuminated by the antenna.

The vector velocity system of the present invention provides a measurement of the angular velocity $V_A$ and the path angle $\phi$ with a single observation or illumination of the object. Radial velocity $V_R$ and range R can be determined by conventional doppler techniques. Knowing angular velocity $V_A$ and range R, the object offset distance $x$ can be calculated by conventional techniques using equation (3).

Although the system of the present invention has been described in terms of adding the capability for measuring the angular or vector velocity of objects to a conventional doppler system, the system may be utilized to add a similar capability to any type conventional system, for example to a synthetic aperture radar or to a sonar or to an optical or acoustic system. All that is needed is for the system being modified to be a coherent system. It should be understood therefore that the scope of the invention should not be limited by the particular embodiment of the invention by way of description and illustration, but rather by the appendant claims.

I claim:

1. In a coherent vector velocity system having a transmitter operating at wavelength $\lambda$, a receiver and an antenna of beam width angle $\theta$ for illuminating an object, with the receiver output including the sum of steady in time and time varying frequency components produced by the echo from the illuminated object, the improvement for measuring the angular velocity of the object in a single illumination, including in combination:

a data processor having first sorting means and second computation means, said first means including a plurality of selecting circuits connected in parallel, each of said circuits selecting from the input thereto, a signal of a specific center frequency $f_{mn}$ and a specific bandwidth $B_{mn}$, and providing an output signal identifying the circuit when an input signal is selected, said second means having the output signals of said selecting circuits as an input and including means for computing the angular velocity $V_A$ of the object illuminated for a specific selecting circuit output signal; and circuit means for connecting the receiver output as an input to each of said selecting circuits.

2. A system as defined in claim 1 wherein said means for computing angular velocity includes means for calculating $B_{mn} = (2/\lambda)V_A \cdot \theta$.

3. A system as defined in claim 1 wherein said second means also includes means for computing the angle $\phi$ of the path of the object illuminated.

4. A system as defined in claim 3 wherein said means for computing path angle includes means for calculating $\tan \phi_{mn} = f_{mn}/B_{mn} \cdot \theta$.

5. A system as defined in claim 4 wherein said means for computing angular velocity includes means for calculating $B_{mn} = (2/\lambda)V_A \cdot \theta$.

6. A system as defined in claim 1 wherein said second means also includes means for computing the radial velocity $V_R$ of the object illuminated.

7. A system as defined in claim 6 wherein said means for computing radial velocity includes means for calculating $f_{mn} = (2/\lambda)V_R$.

8. A system as defined in claim 6 wherein said second means also includes means for computing the vector velocity V of the object illuminated.

9. A system as defined in claim 1 wherein said second means also includes means for computing the distance x between the object and the antenna line of sight.

10. A system as defined in claim 9 wherein said means for computing distance x includes means for calculating $f_{mn}' = 2/\lambda V_A \cdot x/R$, where R is the distance between the object and the antenna, and $f_{mn}'$ is the angle doppler frequency component of the receiver output.

11. A system as defined in claim 1 wherein said selecting circuits comprise correlators.

12. A system as defined in claim 1 wherein said selecting circuits comprise matched filters.

13. A system as defined in claim 1 wherein said selecting circuits comprise pulse compression filters.

14. A system as defined in claim 1 wherein said transmitter operates as a pulsed transmitter.

15. A system as defined in claim 1 wherein said transmitter operates as a continuous wave (CW) transmitter.

16. A method of measuring the angular velocity $V_A$ of an object in a single illumination by a coherent vector velocity system having a transmitter operating at wavelength $\lambda$, a receiver, and an antenna of beamwidth angle $\theta$, including the steps of:

illuminating the object and receiving an echo from the object as it moves along a path at angle $\phi$ and velocity V, with the receiver output including a time varying signal of frequency $f_{mn}$ and bandwidth $B_{mn}$ produced by the echo from the illuminated object;

generating a selection signal corresponding to the specific frequency and bandwidth in the receiver output; and calculating the angular velocity $V_A$ of the object for such specific frequency and bandwidth.

17. The method of claim 16 including performing the calculation $B_{mn} = (2/\lambda)V_A \cdot \theta$.

18. The method of claim 16 including the step of calculating the path angle $\phi$ of the object for such specific frequency and band width.

19. The method of claim 18 including performing the calculation $\tan \phi_{mn} = f_{mn}/B_{mn} \cdot \theta$.

20. The method of claim 19 including performing the calculation $B_{mn} = (2/\lambda)V_A \cdot \theta$.

21. The method of claim 16 including the step of calculating the radial velocity $V_R$ of the object illuminated.

22. The method of claim 21 including performing the calculation $f_{mn} = (2/\lambda)V_R$.

23. The method of claim 21 including the step of calculating the vector velocity V of the object illuminated.

24. The method of claim 16 including the step of calculating the distance x between the object and the antenna line of sight.

25. The method of claim 24 including performing the calculation $f_{mn}' = 2/\lambda V_A \cdot x/R$, where R is the distance between the object and the antenna, and $f_{mn}'$ is the angle doppler frequency component of the receiver output.

* * * * *